222-620
SR
XR X 9,024
9024X
J. Hatch.
Fertilizer.
Patented Aug. 17, 1836.
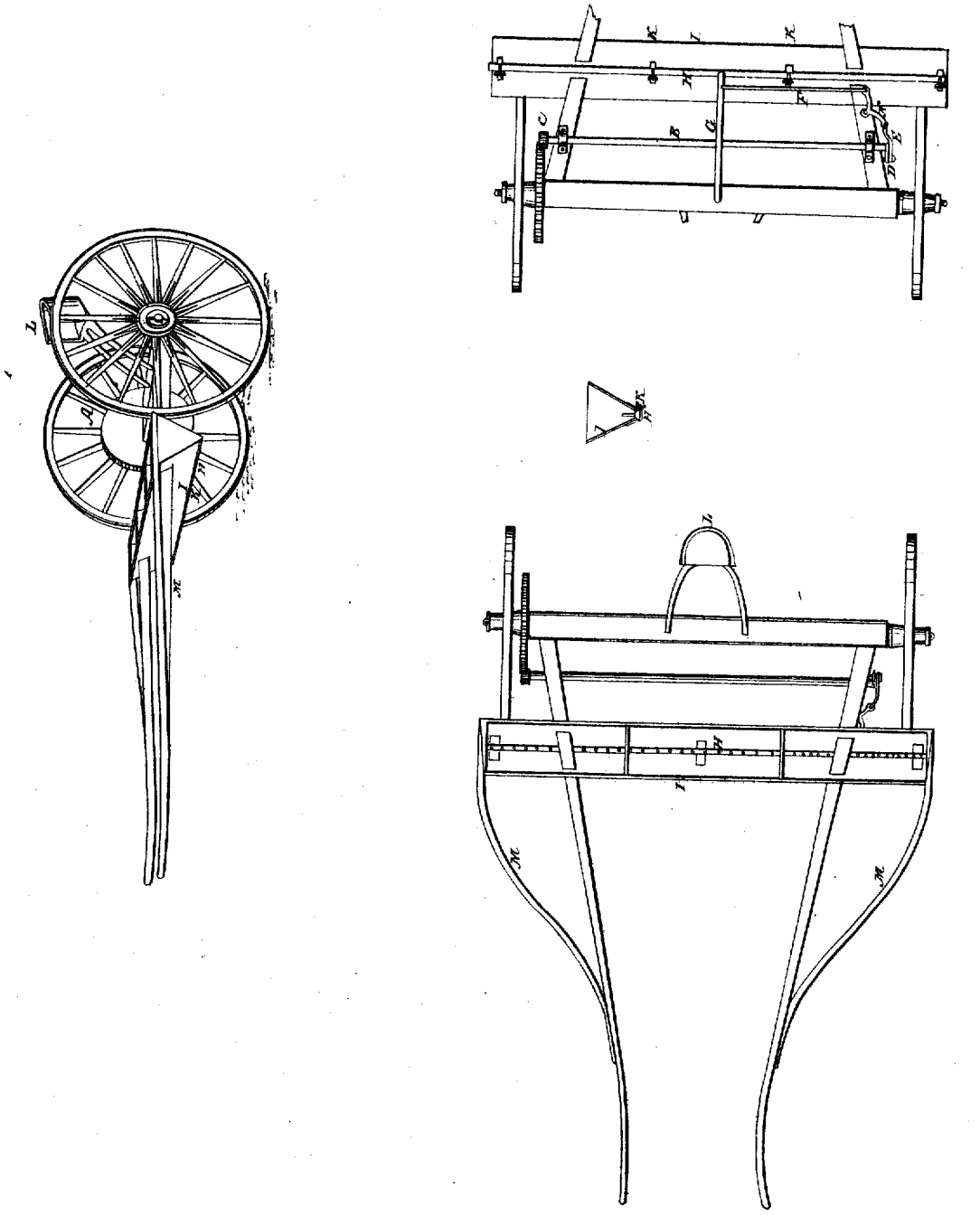

9024X {Re-issued January 9th 1838} Aug. 17. 1835 121.

Julius Hatch Aug 17, 1835

The Schedule referred to in these Letters Patent and making part of the same containing a description in the words of the said Julius Hatch himself of his improvement in the Machine for sowing plaister, lime (and) other.

Be it known that I Julius Hatch of Great Bend Susquehannah Co. Penn. have made an improvement in the machine for sowing plaister, lime and other which is described as follows: This machine consists of two or four wheels a common axle tree or axle trees, and a pair of shafts for the purpose of moving the machine wherever wanted when thrown out of gear; a band or cog wheel on the inside of one of the wheels in its hub, a revolving shaft with a pinion or whirl, working at one of its ends, and a crank at the other placed under the shafts. a longitudinal rod passing from the crank to an elbow, formed of a right angle placed under one of the shafts. a horizontal rod from the elbow, an arm fastened by a pin on the axle tree. a sliding rod with its teeth at the bottom of the angular box, the angular box itself, its regulating guages with their screws on which the sliding rod rests. a double apron to prevent the plaister &c flying about. the drivers seat, and the fenders on the sides of the shafts. The wheels, the axle tree, & the shafts for moving the machine or apparatus are of the ordinary construction as are also the band or cog wheel placed against or fastened to the hub of the wheel and its pinion or whirl & revolving shaft, and their position common to various seed machines. The revolving shaft is placed under the shafts (and) is parallel. and a suitable distance from the axle tree and behind the angular box. The first mentioned rod connected by a crank at the end of the revolving shaft, runs parallel to one of the horse shafts. The elbow is formed of two sides producing a right angle. The horizontal rod connected with the inside arm arm of the elbow. runs to the arm. The arm is fastened at one end by a pin or screw to the axle tree which is its fulcrum, its other end is ~~screwed~~ secured by a staple or otherwise & is fastened about the centre of the sliding rod. The angular box for the reception of the plaister &c is formed of two sides about 11 inches deep, each, and are about 14 inches apart at top. They are confined at their ends by angular pieces of wood and at suitable distances, inside are angular pieces running partly down towards the bottom of the sides, not only to strengthen the box but to permit the plaister &c to pass underneath. The lower sides of the angular box are regulated by the screws to suit the nature of the matter to be distributed. The box may have a cover for protection from the weather. It is partly suspended ~~from~~ by the shafts &c is in front of the driving wheels. The sliding rod is placed beneath the sides of the box and has teeth placed at suitable distances apart to agitate the plaister &c. The regulating guages are fastened by screws to the sides of the box. and a screw to the ends of every couple of guages placed at suitable distances apart the whole length of the box increase or lessen the aperture at the lower sides of the box. The double apron for preventing the flying off of the plaister &c is suspended from the lower side of the box to within a suitable distance of the ground. In some cases the apron may be dispensed with. The drivers seat is placed on inclined arms fastened on the upper side of the axle tree, running back, to preserve the equilibrium of the machine and for the drivers convenience. The feeders are bent pieces of wood which are fastened about the middle of the outer part of each shaft & run to each end of the box, and their object is to protect the angular box from injury. This arrangement for a cart fixture can be adapted to a waggon when the invention is wanted for extensive operations. By mixing clover or timothy Timothy seed with plaister, lime, ashes or earth. the seed may be spread in a proper manner. Operation. The horse or moving power being applied to the shafts and set in motion, the supporting wheels revolve, one of which turns a cog or band wheel secured thereto by pins or screws, this band or cogwheel works in connection with a pinion or wheel which is fastened securely at one end of the revolving axle. As the axle revolves, it turns the crank at its end which moves the crank rod & the elbow which communicates the motion to the arm. The arm being secured to the sliding rod moves it to and fro horizontally which agitating the plaster &c suffers it to fall to the ground. For further illustration of my invention I refer to the model and drawing in the Patent Office. What I claim as my invention and for which I solicit Letters Patent is the arrangement and adaptation of the crank crank rod, elbow & horizontal rod, arm and sliding rod with its teeth together with the regulating guages, as described in the foregoing specification of this machine for sowing plaister, lime, and ashes Witnesses J. A. Elliot Clement T Cook Julius Hatch (935 words)

(Drawing made)